US012592731B2

(12) United States Patent
Takayama

(10) Patent No.: US 12,592,731 B2
(45) Date of Patent: Mar. 31, 2026

(54) NOISE CANCELING APPARATUS, NOISE CANCELING METHOD, AND ELECTRONIC EQUIPMENT

(71) Applicant: Sony Group Corporation, Tokyo (JP)

(72) Inventor: Masaomi Takayama, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 298 days.

(21) Appl. No.: 18/547,939

(22) PCT Filed: Jan. 14, 2022

(86) PCT No.: PCT/JP2022/001185
§ 371 (c)(1),
(2) Date: Aug. 25, 2023

(87) PCT Pub. No.: WO2022/185737
PCT Pub. Date: Sep. 9, 2022

(65) Prior Publication Data

US 2024/0137057 A1      Apr. 25, 2024
US 2024/0235594 A9      Jul. 11, 2024

(30) Foreign Application Priority Data

Mar. 2, 2021      (JP) ................................. 2021-032481

(51) Int. Cl.
*H04B 1/10*          (2006.01)
(52) U.S. Cl.
CPC ......... *H04B 1/1009* (2013.01); *H04B 1/1036* (2013.01)

(58) Field of Classification Search
CPC .. H04B 1/1009; H04B 1/1036; H04B 17/346; H04B 1/10; H04B 1/126; H04B 15/00; H04B 1/109; H04B 1/707
See application file for complete search history.

(56) References Cited

U.S. PATENT DOCUMENTS

| | | | | | |
|---|---|---|---|---|---|
| 6,006,071 | A | * | 12/1999 | Roberts .................. | H04B 15/00 |
| | | | | | 455/67.15 |
| 6,420,992 | B1 | * | 7/2002 | Richmond ................ | G01S 7/38 |
| | | | | | 342/204 |

(Continued)

FOREIGN PATENT DOCUMENTS

| | | |
|---|---|---|
| JP | 2011176659 A | 9/2011 |
| WO | 2012127594 A1 | 9/2012 |

OTHER PUBLICATIONS

International Search Report (PCT/ISA/210), International Application No. PCT/JP2022/001185, dated Apr. 12, 2022.

*Primary Examiner* — Jinsong Hu
*Assistant Examiner* — Rui M Hu
(74) *Attorney, Agent, or Firm* — Michael Best & Friedrich LLP

(57) ABSTRACT

Receiver sensitivity deterioration in a wireless receiver section due to radio noise is reduced.
A noise acquisition section acquires noise generated from a noise source. A noise adjustment section obtains a noise canceling signal by adjusting a phase and a gain of the noise acquired by the noise acquisition section. Subsequently, an antenna section transmits the noise canceling signal obtained by the noise adjustment section. For example, the noise acquisition section acquires the noise generated from the noise source by allowing the antenna section to receive the noise or acquires the noise through electrical wiring.

19 Claims, 10 Drawing Sheets

(56) References Cited

U.S. PATENT DOCUMENTS

| | | | | |
|---|---|---|---|---|
| 6,492,937 | B1 * | 12/2002 | Sparrow | G01S 13/86 |
| | | | | 342/357.29 |
| 7,058,368 | B2 | 6/2006 | Nicholls | |
| 7,277,725 | B1 * | 10/2007 | Henry | H04B 1/525 |
| | | | | 455/296 |
| 7,725,079 | B2 * | 5/2010 | Kim | H04B 1/123 |
| | | | | 455/114.2 |
| 8,103,235 | B2 * | 1/2012 | Shiotsu | H04B 15/00 |
| | | | | 455/296 |
| 8,315,583 | B2 * | 11/2012 | Stelliga | H04B 15/00 |
| | | | | 455/299 |
| 8,428,540 | B2 * | 4/2013 | Shiba | H04B 1/126 |
| | | | | 455/283 |
| 8,666,348 | B2 * | 3/2014 | Itasaki | H04B 1/126 |
| | | | | 455/226.1 |
| 9,344,125 | B2 * | 5/2016 | Kpodzo | H04B 1/10 |
| 2004/0102174 | A1 * | 5/2004 | Kurita | H04B 1/126 |
| | | | | 455/200.1 |
| 2004/0185815 | A1 * | 9/2004 | Fukuda | H04B 1/126 |
| | | | | 455/296 |
| 2009/0016545 | A1 * | 1/2009 | Stelliga | H04B 15/00 |
| | | | | 381/94.3 |
| 2009/0181632 | A1 * | 7/2009 | Shiba | H04B 1/126 |
| | | | | 455/296 |
| 2009/0197558 | A1 * | 8/2009 | Shiotsu | H04B 15/00 |
| | | | | 455/296 |
| 2010/0289688 | A1 * | 11/2010 | Sherman | H04K 3/28 |
| | | | | 342/16 |
| 2012/0088465 | A1 * | 4/2012 | Yokota | H04B 1/1036 |
| | | | | 455/278.1 |
| 2013/0064382 | A1 * | 3/2013 | Stelliga | H04B 15/00 |
| | | | | 381/71.1 |
| 2013/0122844 | A1 * | 5/2013 | Itasaki | H04B 1/1027 |
| | | | | 455/226.1 |
| 2013/0210377 | A1 * | 8/2013 | Kondo | H04B 1/1027 |
| | | | | 455/150.1 |
| 2014/0056337 | A1 * | 2/2014 | Kesling | H04B 1/38 |
| | | | | 375/346 |
| 2019/0267956 | A1 * | 8/2019 | Granger-Jones | H04B 1/109 |
| 2022/0182090 | A1 * | 6/2022 | Imamura | H04B 1/10 |
| 2023/0198577 | A1 * | 6/2023 | Xia | H04B 1/1036 |
| | | | | 375/262 |
| 2024/0305324 | A1 * | 9/2024 | Johnson | H04B 1/1036 |

\* cited by examiner

F I G . 4
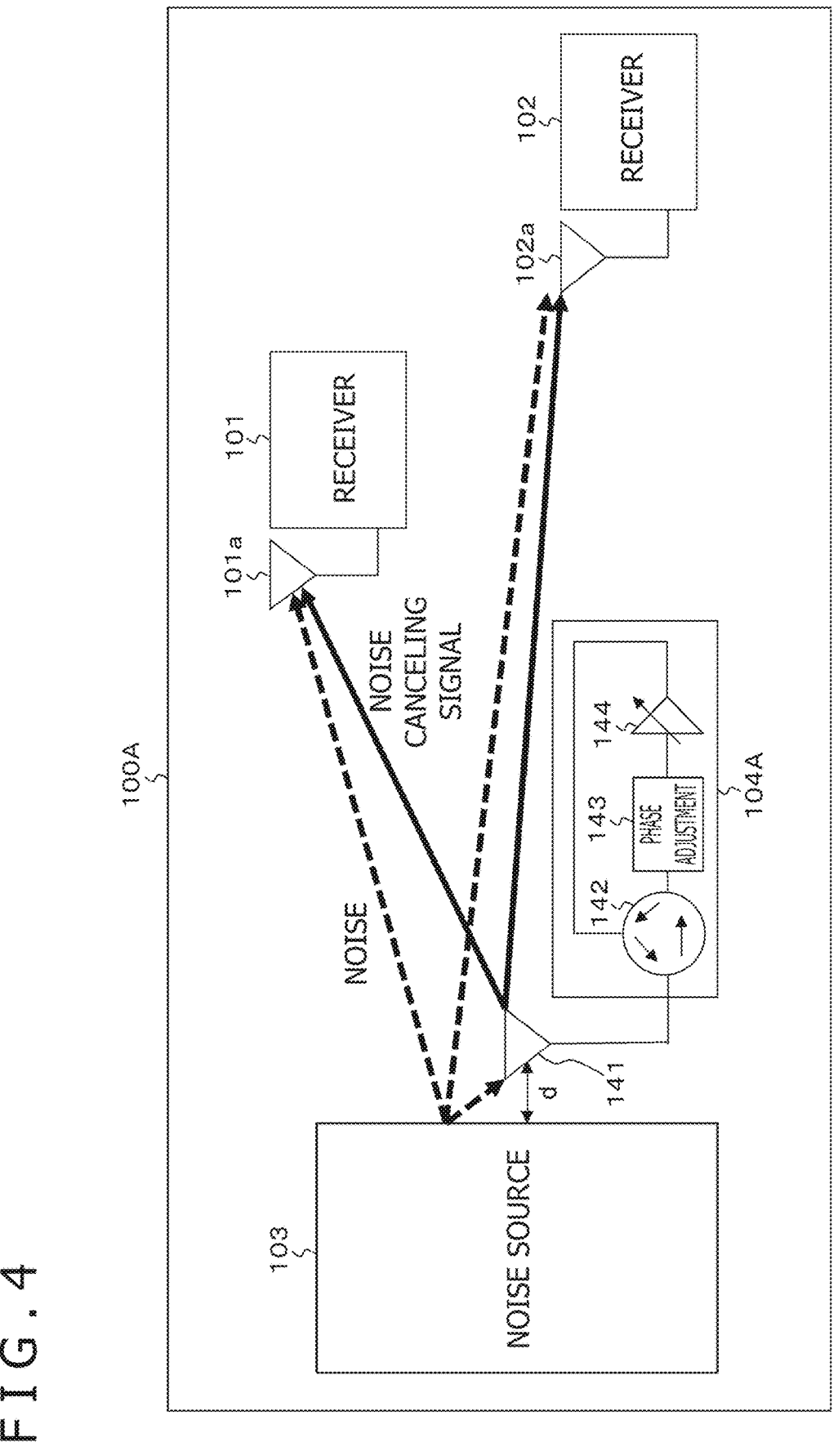

F I G . 6
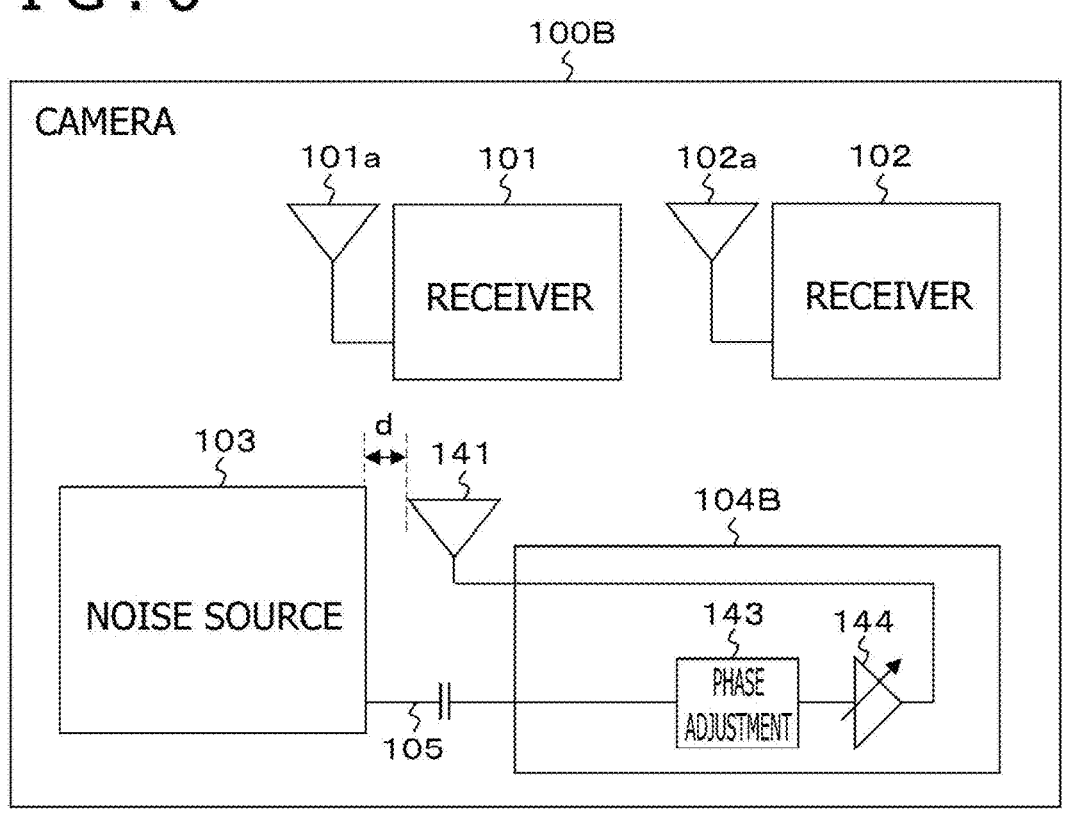
F I G . 7
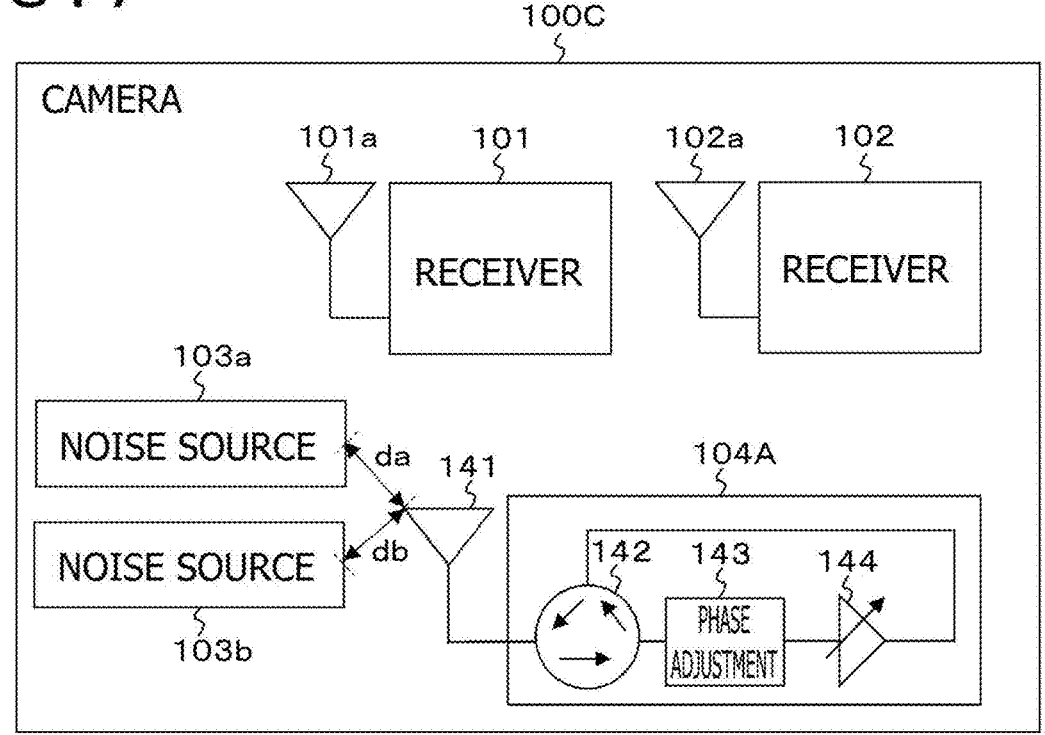

F I G . 8
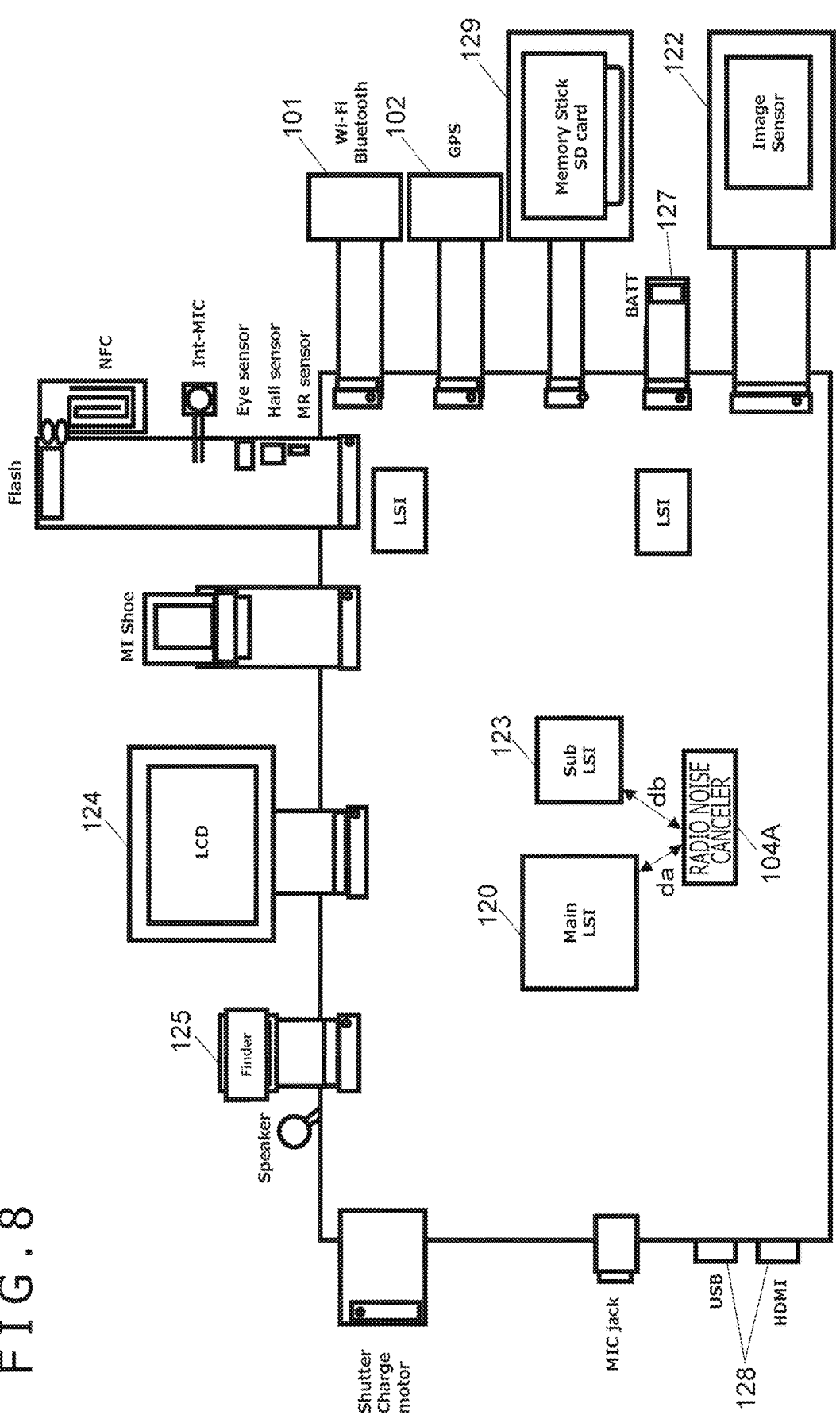

F I G . 9
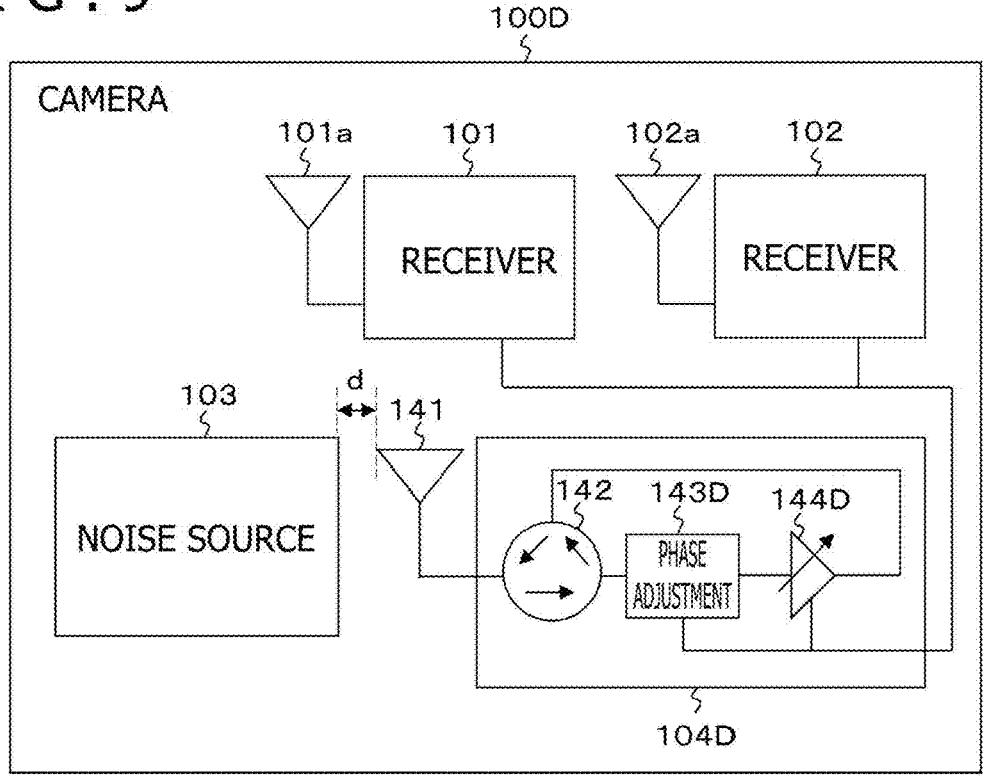
F I G . 1 0
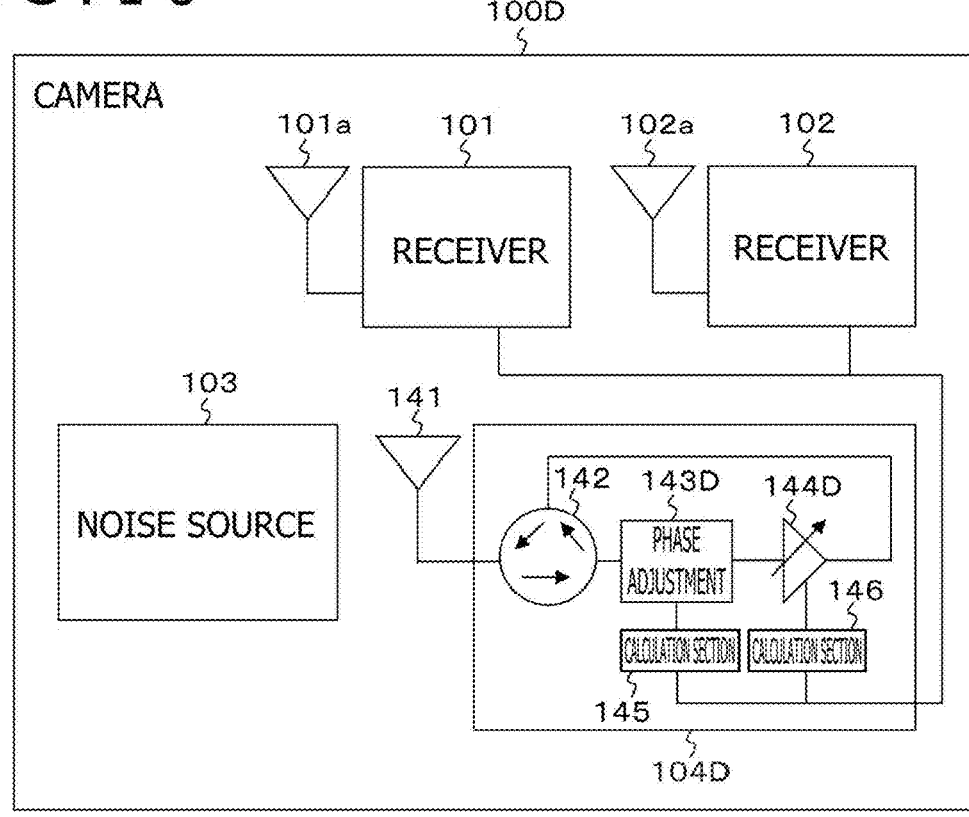

NOISE CANCELING APPARATUS, NOISE CANCELING METHOD, AND ELECTRONIC EQUIPMENT

TECHNICAL FIELD

The present technology relates to a noise canceling apparatus, a noise canceling method, and electronic equipment, and more particularly relates, for example, to a noise canceling apparatus capable of reducing sensitivity deterioration of a wireless receiver due to radio noise.

BACKGROUND ART

In recent years, the IoT (Internet of Thing) has been remarkably developed. Therefore, various types of wireless functions are incorporated in a wide range of goods including various products for personal use and infrastructure equipment. These products and pieces of equipment are multi-functional and small in size, and equipped with a wide variety of wireless functions and antennas. In this case, the characteristics of the wireless functions are directly linked to commodity value, so that wireless performance is an important product specification.

In the above-mentioned circumstances, noise is generated by various parts in the products and equipment, such as an LSI (Large Scale Integration). When the generated noise is in the range of wireless frequencies used, sensitivity deterioration occurs and becomes a factor for degrading product characteristics. Further, the number of noise sources is increasing due to multi-functionalization in recent years. Additionally, a continuous increase occurs in the number of receivers and antennas used to cope with an increase in the number and speed of wireless functions and with an increase in the coverage area.

Proposed, for example, in PTL 1 is a transceiver that improves receiver sensitivity by making phase, delay, and amplitude adjustments of noise extracted by a noise extractor and feeding the results of adjustments back to a demodulator. This transceiver makes it necessary to draw a circuit pattern for connecting the noise extractor to the demodulator, and is thus unfavorable for substrate design. Further, a mixer, an LNA (Low Noise Amplifier), and a filter need to be added to the demodulator. Adding these circuits considerably attenuates desired waves. This causes problems where, for example, sensitivity deterioration occurs in a case where no noise is generated.

CITATION LIST

Patent Literature

[PTL 1]
Japanese Patent Laid-open No. 2011-176659

SUMMARY

Technical Problem

An object of the present technology is to reduce sensitivity deterioration of a wireless receiver section due to radio noise.

Solution to Problem

A concept of the present technology is to provide a noise canceling apparatus including a noise acquisition section that acquires noise generated from a noise source, a noise adjustment section that obtains a noise canceling signal by adjusting a phase and a gain of the noise acquired by the noise acquisition section, and an antenna section that transmits the noise canceling signal obtained by the noise adjustment section.

According to the present technology, the noise acquisition acquires the noise generated from a noise source. The noise adjustment section obtains the noise canceling signal by adjusting the phase and the gain of the noise acquired by the noise acquisition section. Eventually, the antenna section transmits the noise canceling signal obtained by the noise adjustment section.

As described above, the present technology acquires the noise generated from a noise source, obtains the noise canceling signal by adjusting the phase and the gain of the acquired noise, and transmits the obtained noise canceling signal from the antenna section. This makes it possible to properly cancel the noise, which is generated from the noise source to affect the sensitivity of a predetermined wireless receiver section, and reduce sensitivity deterioration of the wireless receiver section due to radio noise. Further, it is possible to cancel the noise reducing the sensitivity in the predetermined wireless receiver section without adding a circuit to the predetermined wireless receiver section. Moreover, even when there is a plurality of predetermined wireless receiver sections, noise cancelation can be achieved by a single noise canceling apparatus.

Alternatively, the present technology may be configured such that, for example, the noise acquisition section allows the antenna section to receive the noise generated from the noise source to acquire the noise. This alternative case makes it possible to effectively use the antenna section, and requires no electrical wiring to acquire the noise from the noise source. Therefore, the noise canceling apparatus can easily be disposed, for example, in electronic equipment. Further, noise generated from a plurality of noise sources can be acquired by a single antenna section.

In the above case, the noise canceling apparatus may include a directional coupler section. The directional coupler section sends the noise, which is generated from the noise source and received by the antenna section, to the noise adjustment section, and sends the noise canceling signal, which is obtained by the noise adjustment section, to the antenna section. When the directional coupler section is included in the noise canceling apparatus, the antenna section can effectively be used for noise reception and noise canceling signal transmission. For example, a circulator may be used as the directional coupler section. Directional coupling can properly be achieved by the circulator.

Alternatively, the present technology may be configured such that, for example, the noise acquisition section acquires the noise, which is generated from the noise source, through electrical wiring. This alternative case eliminates the necessity of adding the directional coupler section to the noise canceling apparatus as in the case where the antenna section is used also for noise reception, and makes it possible to precisely acquire the noise generated from the noise source to which attention is paid.

Alternatively, the present technology may be configured such that, for example, the antenna section is disposed to be spaced from the noise source by a distance of equal to or less than $\frac{1}{10}$ the wavelength of a radio signal to be received by the predetermined wireless receiver section. In a case where the noise, which is generated from the noise source to affect the sensitivity of the predetermined wireless receiver section, is to be canceled by the noise canceling signal, which is transmitted from the antenna section in an opposite phase to the noise, this alternative case reduces the phase shift between the noise and the noise canceling signal and thus improves cancelation accuracy.

Alternatively, the present technology may be configured such that, for example, the noise adjustment section adjusts the phase and the gain of the noise, which is acquired by the noise acquisition section, in accordance with sensitivity information regarding the predetermined wireless receiver section. This alternative makes it possible to adjust the phase and the gain so as to constantly optimize the sensitivity in the predetermined wireless receiver section.

Alternatively, the present technology may be configured such that, for example, a noise source may be a noise source being present in electronic equipment having the predetermined wireless receiver section, for example, a camera. This alternative case allows the noise canceling apparatus to cancel noise that is generated from the noise source in the electronic equipment to affect the sensitivity of the predetermined wireless receiver section.

Another concept of the present technology is to provide electronic equipment including a predetermined wireless receiver section, a noise source that generates noise affecting sensitivity of the predetermined wireless receiver section, and a noise canceling apparatus, in which the noise canceling apparatus includes a noise acquisition section that acquires noise generated from the noise source, a noise adjustment section that obtains a noise canceling signal by adjusting a phase and a gain of the noise acquired by the noise acquisition section, and an antenna section that transmits the noise canceling signal obtained by the noise adjustment section.

The electronic equipment according to the present technology includes the predetermined wireless receiver section, the noise source generating noise affecting the sensitivity of the predetermined wireless receiver section, and the noise canceling apparatus. In the noise canceling apparatus, the noise acquisition section acquires the noise generated from the noise source, the noise adjustment section obtains the noise canceling signal by adjusting the phase and the gain of the noise acquired by the noise acquisition section, and the antenna section transmits the noise canceling signal obtained by the noise adjustment section.

As described above, the noise canceling apparatus according to the present technology acquires the noise generated from the noise source, obtains the noise canceling signal by adjusting the phase and the gain of the acquired noise, and transmits the obtained noise canceling signal from the antenna section. This makes it possible to properly cancel the noise, which is generated from the noise source to affect the sensitivity of the predetermined wireless receiver section, and reduce sensitivity deterioration of the wireless receiver section due to radio noise. Further, it is possible to cancel the noise reducing the sensitivity in the predetermined wireless receiver section without adding a circuit to the predetermined wireless receiver section. Moreover, even when there is a plurality of predetermined wireless receiver sections, noise cancelation can be achieved by a single noise canceling apparatus.

BRIEF DESCRIPTION OF DRAWINGS

FIG. 4 is a schematic overview diagram illustrating how a noise canceling signal from the radio noise canceler cancels the noise that is generated from the noise source to affect the sensitivity of the wireless receiver.

FIG. 6 is a diagram illustrating an example configuration of the camera according to a second embodiment.

FIG. 7 is a diagram illustrating an example configuration of the camera according to a third embodiment.

FIG. 8 is a diagram illustrating an example location of a radio noise canceler that is mounted on a substrate in a case where a main LSI and a sub LSI act as two noise sources generating noise affecting the sensitivity of the wireless receiver in the camera.

FIG. 9 is a diagram illustrating an example configuration of the camera according to a fourth embodiment.

FIG. 10 is a diagram illustrating an example of a calculation portion that calculates parameters to be used in a phase adjustment section and a gain adjustment section.

FIG. 11 is a diagram illustrating another example of the calculation portion that calculates the parameters to be used in the phase adjustment section and the gain adjustment section.

FIG. 12 is a diagram illustrating still another example of the calculation portion that calculates the parameters to be used in the phase adjustment section and the gain adjustment section.

DESCRIPTION OF EMBODIMENTS

Embodiments for implementing the invention (hereinafter referred to as the embodiments) will now be described. The description will be given in the following order.

Figure 1:
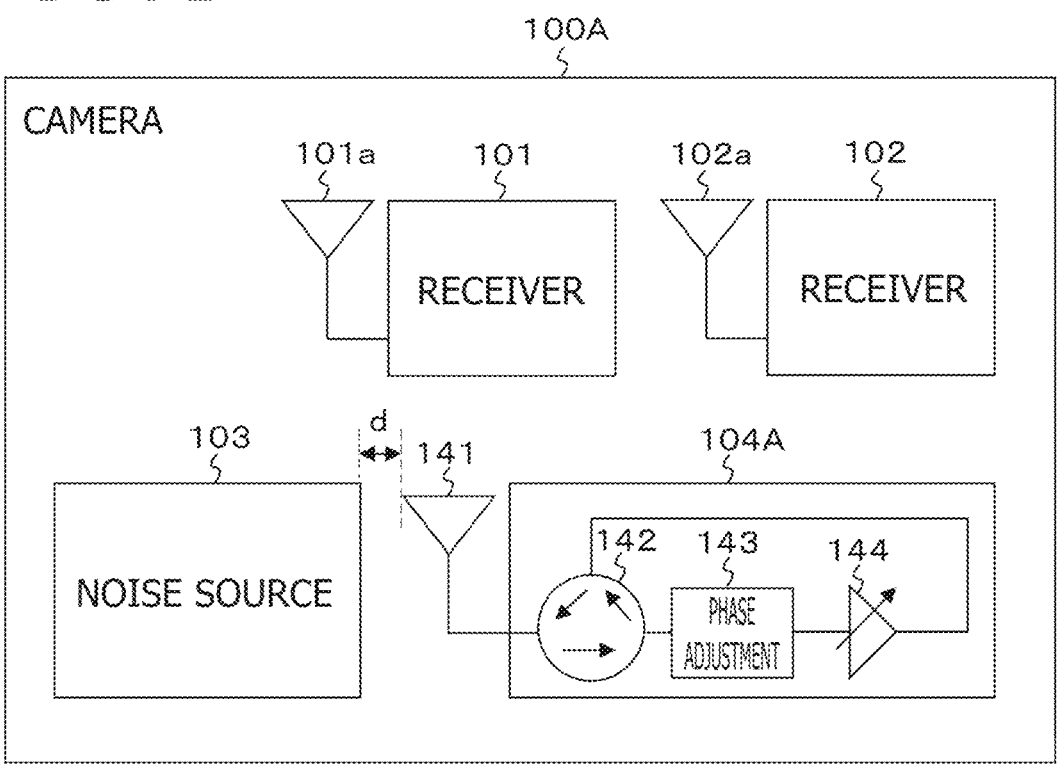
FIG. 1 is a diagram illustrating an example configuration of a camera according to a first embodiment.

1. First Embodiment
2. Second Embodiment
3. Third Embodiment
4. Fourth Embodiment
5. Modifications 1. First Embodiment FIG. 1 illustrates an example configuration of a camera 100A according to a first embodiment. The camera 100A includes wireless receivers 101 and 102, a noise source 103, and a radio noise canceler 104A that functions as a noise canceling apparatus.

For example, a Wi-Fi/Bluetooth receiver having Wi-Fi and Bluetooth communication functions is used as the wireless receiver 101, which includes an antenna 101a. Meanwhile, for example, a GPS (Global Positioning System) receiver is used as the wireless receiver 102, which includes an antenna 102a. Here, "Bluetooth" is a registered trademark. It should be noted that two wireless receivers are included in the example. However, the number of wireless receivers is not limited to two. One or three or more wireless receivers may be included.

The noise source 103 is a portion that generates noise (radio noise), which affects the sensitivity of the wireless receivers 101 and 102 in the camera 100A. The noise source 103 includes one or more devices, such as an LSI for performing, for example, signal processing, control processing, or the like, a DC-DC converter included in a power supply section, and an image sensor. It should be noted that, in a case where the noise source includes a plurality of devices, the radio noise canceler 104A may preferentially be added to devices radiating a large amount of noise.

The radio noise canceler 104A includes an antenna 141, a circulator 142 forming a directional coupler section, a phase adjustment section 143, and a gain adjustment section 144.

The antenna 141 not only receives noise generated from the noise source 103, but also transmits a noise canceling signal outputted from the gain adjustment section 144. The radio noise canceler 104A is disposed in the camera 100A in such a manner that the distance d between the antenna 141 and the noise source 103 is equal to or less than ¹⁄₁₀ the wavelength of a radio signal to be received by the wireless receivers 101 and 102.

Since the radio noise canceler 104A is disposed as described above, in a case where noise generated from the noise source 103 to affect the sensitivity of the wireless receivers 101 and 102 is to be canceled by the noise canceling signal, which is transmitted from the antenna 141 in an opposite phase to the noise, the phase shift between the noise and the noise canceling signal can be reduced to improve cancelation accuracy as described later.

The circulator 142 not only transmits the noise, which is received by the antenna 141, to the phase adjustment section 143, but also transmits the noise canceling signal, which is outputted from the gain adjustment section 144, to the antenna 141. It should be noted that an alternative device having a directional coupling function similar to that of the circulator 142 may be used in place of the circulator 142.

The phase adjustment section 143 and the gain adjustment section 144 constitute a noise adjustment section to obtain the noise canceling signal by not only inverting the phase of the noise sent from the circulator 142, but also appropriately adjusting the gain of the noise. In this instance, predetermined parameters (parameters determined, for example, by experiments before or during a design process) are used for phase adjustment in the phase adjustment section 143 and for gain adjustment in the gain adjustment section 144.

In the camera 100A depicted in FIG. 1, the noise generated from the noise source 103 is received by the wireless receivers 101 and 102. Further, the noise generated from the noise source 103 is also received by the antenna 141 of the radio noise canceler 104A.

In the radio noise canceler 104A, the phase and the gain of the received noise are adjusted by the phase adjustment section 143 and the gain adjustment section 144 so as to generate the noise canceling signal having an opposite phase to the received noise, and then the generated noise canceling signal is transmitted from the antenna 141. The noise canceling signal transmitted from the antenna 141 is also received by the wireless receivers 101 and 102.

In each of the wireless receivers 101 and 102, the received noise is canceled by the received noise canceling signal. This enables each of the wireless receivers 101 and 102 to receive only a desired signal. This results in reducing (suppressing) the deterioration of receiver sensitivity due to radio noise generated from the noise source 103.

Figure 2:
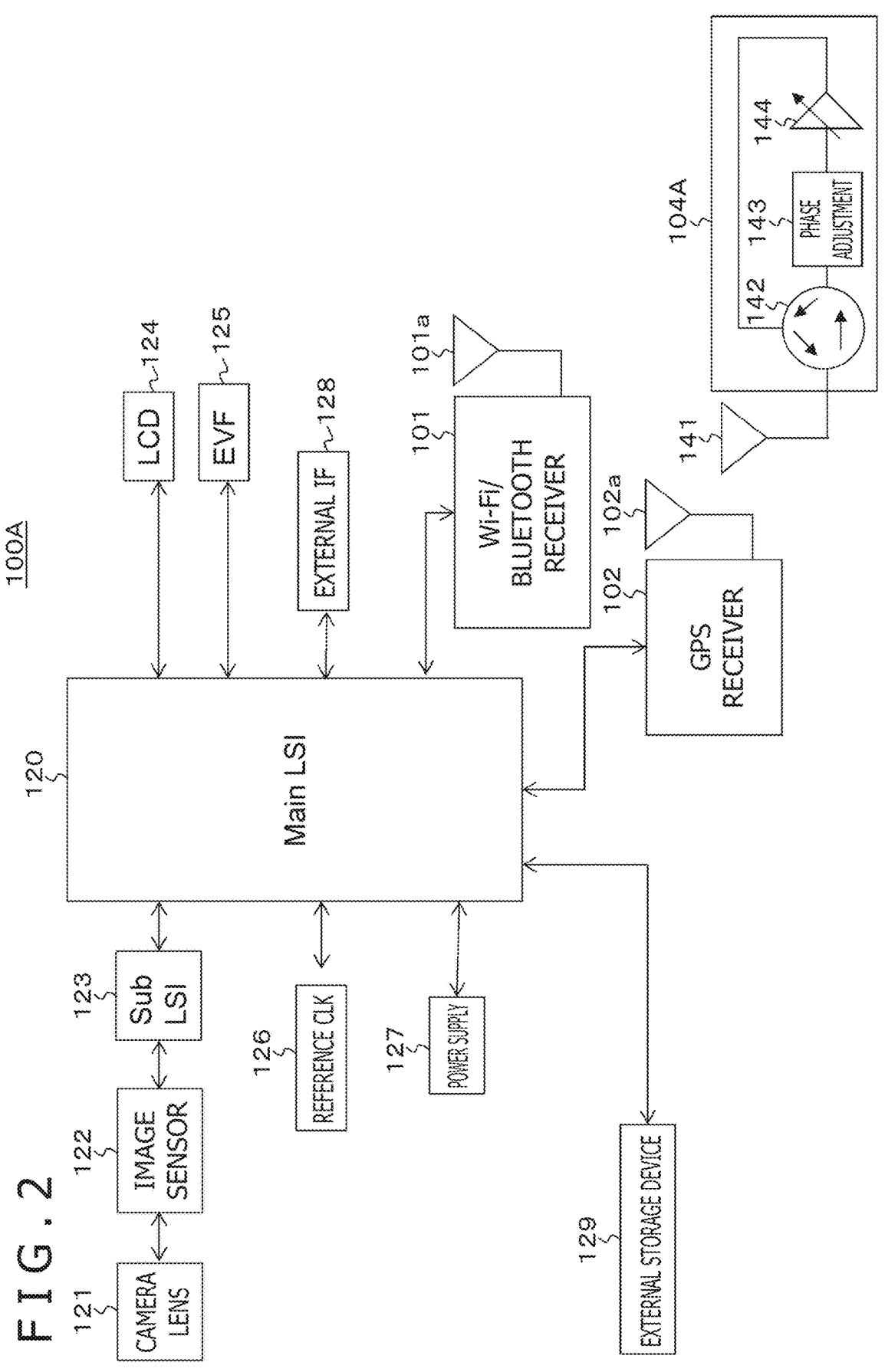
FIG. 2 is a diagram illustrating a detailed example configuration of the camera.

FIG. 2 illustrates a detailed example configuration of the camera 100A. Portions depicted in FIG. 2 in correspondence with those depicted in FIG. 1 are designated by the same reference signs as used in FIG. 1.

A main LSI 120 performs, for example, various kinds of signal processing in the camera 100A, control processing for each section of the camera 100A, and the like. An image sensor 122 captures an image of a subject through a camera lens 121. A sub LSI 123 performs a predetermined process on a captured image signal obtained by the image sensor 122, and then supplies the resulting processed image signal to the main LSI 120.

The main LSI 120 is connected to display components, namely, an LCD panel 124 and an electronic viewfinder 125. Further, a reference clock 126 and electrical power supply 127 are supplied to the main LSI 120. Furthermore, the main LSI 120 is connected to an external interface 128, such as an HDMI (High-Definition Multimedia Interface) or a USB (Universal Serial Bus), and to an external storage device 129, such as a memory stick.

Moreover, the main LSI 120 is connected to a Wi-Fi/ Bluetooth receiver 101 having Wi-Fi and Bluetooth communication functions, and connected to a GPS receiver 102.

Regarding Wi-Fi communication, the Wi-Fi/Bluetooth receiver 101 receives a signal notifying the camera 100A that, for example, a captured image is transmitted from the camera 100A to an external device, such as a PC (Personal Computer) or a smartphone, and received from the external device.

Further, regarding Bluetooth communication, the Wi-Fi/ Bluetooth receiver 101 is used as a remote controller for the camera 100A. For example, the Wi-Fi/Bluetooth receiver 101 issues an imaging instruction (a shutter instruction) from the smartphone to the camera 100A or instructs the smartphone to receive an image.

Meanwhile, the GPS receiver 102 is used to acquire location information and attach the location information (geotag information and Exif data) regarding the location of image capturing to a captured image.

Further, the camera 100A includes the radio noise canceler 104A. As described with reference to FIG. 1, the radio noise canceler 104A generates the noise canceling signal for canceling the noise, which is generated from the noise source in the camera 100A to affect the sensitivity of the Wi-Fi/Bluetooth receiver 101 and GPS receiver 102, and transmits the generated noise canceling signal from the antenna 141.

Figure 3:
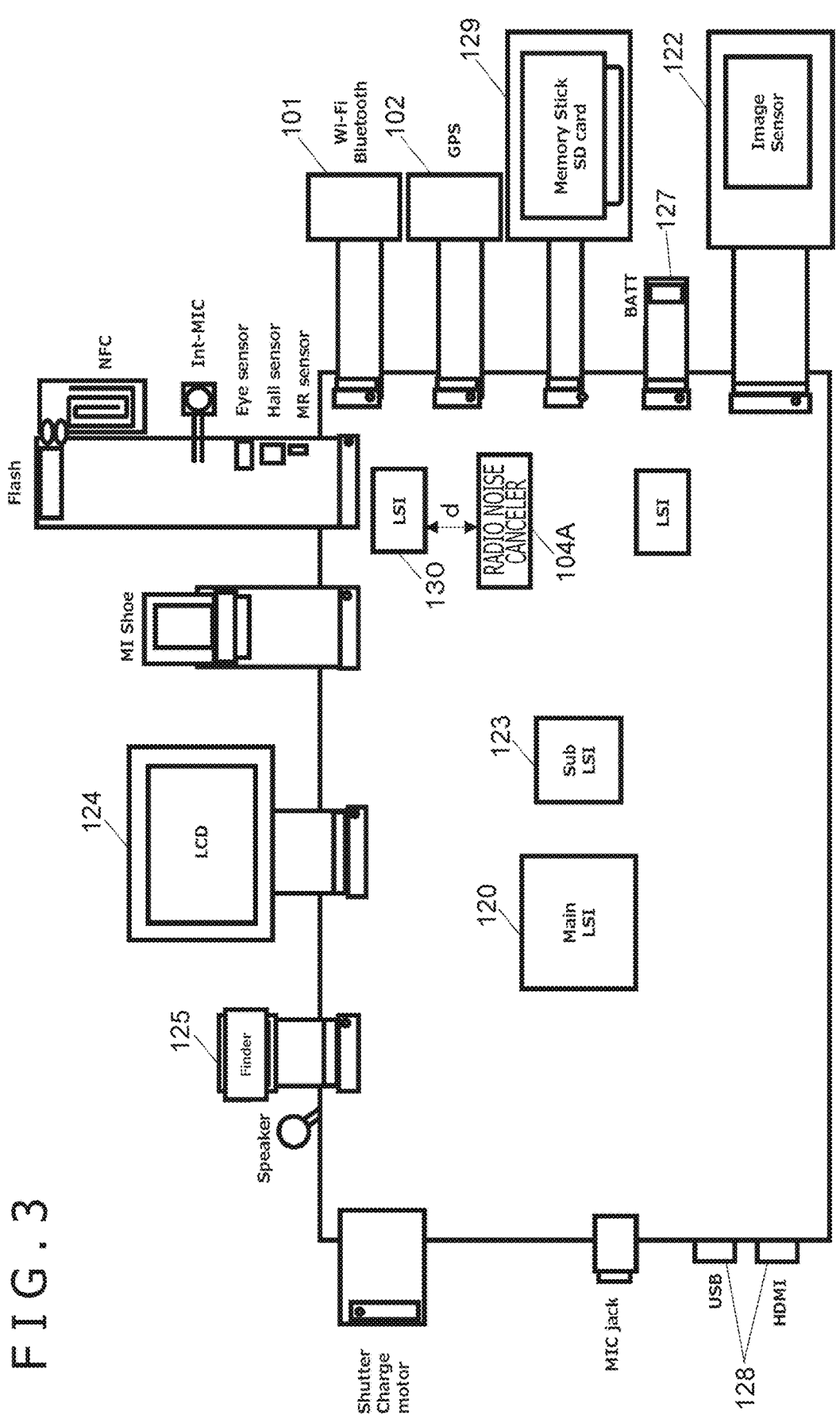
FIG. 3 is a diagram illustrating an example location of a radio noise canceler that is mounted on a substrate in a case where an LSI acts as a noise source generating noise affecting the sensitivity of a wireless receiver in the camera.

FIG. 3 illustrates an example location of the radio noise canceler 104A that is mounted on a substrate in a case where an LSI 130 acts as a noise source generating noise affecting the sensitivity of the Wi-Fi/Bluetooth receiver 101 and GPS receiver 102 in the camera 100A. Portions depicted in FIG. 3 in correspondence with those depicted in FIG. 2 are designated by the same reference signs as used in FIG. 2. It should be noted that devices not depicted in FIG. 2 are additionally disposed on the substrate depicted in FIG. 3. However, such undepicted devices are omitted from the following description.

In the above case, the radio noise canceler 104A is disposed near the LSI 130 in such a manner that the distance d between its antenna 141 (see FIGS. 1 and 2) and the LSI 130 acting as the noise source is equal to or less than ¹⁄₁₀ the wavelength of a radio signal to be received by the Wi-Fi/ Bluetooth receiver 101 and the GPS receiver 102.

Consequently, in a case where the noise generated by the LSI 130, which is the noise source, to affect the sensitivity of the Wi-Fi/Bluetooth receiver 101 and GPS receiver 102 is to be canceled by the noise canceling signal, which is transmitted from the antenna 141 in an opposite phase to the noise, the phase shift between the noise and the noise canceling signal can be reduced to improve cancelation accuracy.

Further, since the radio noise canceler 104A and eventually its antenna 141 are disposed near the LSI 130, the noise generated from the LSI 130 can properly be received by the antenna 141.

FIG. 4 presents a schematic overview illustrating how the noise generated from the noise source 103 to affect the sensitivity of the wireless receivers 101 and 102 is canceled by the noise canceling signal, which is generated by the radio noise canceler 104A according to the noise, transmitted from the antenna 141, and is opposite in phase to the noise.

As mentioned earlier, the noise source 103 includes devices such as an LSI performing, for example, signal processing, control processing, or the like, a DC-DC converter included in a power supply section, and an image sensor. Whenever turned on, these devices generate noise with a frequency, for example, of a few megahertz to tens of gigahertz that affects the sensitivity of the wireless receivers 101 and 102.

Incidentally, the frequency of a radio signal used by Wi-Fi is in the 2.4 GHz band, the 5.2 GHz band, or the like. Further, the frequency of a radio signal used by Bluetooth is in the 2.4 GHz band. Moreover, the frequency of a radio signal used by GPS is, for example, 176.45 MHz, 1227.60 MHz, 1575.42 MHz, or the like.

The noise generated from the noise source 103 is received by the wireless receivers 101 and 102. Further, the noise generated from the noise source 103 is also received by the antenna 141 of the radio noise canceler 104A.

Based on the received noise, the radio noise canceler 104A generates the noise canceling signal having an opposite phase to the received noise. The antenna 141 then transmits the generated noise canceling signal. The noise canceling signal transmitted from the antenna 141 is also received by the wireless receivers 101 and 102.

In each of the wireless receivers 101 and 102, the received noise is canceled by the received noise canceling signal. In the wireless receivers 101 and 102, therefore, receiver sensitivity deterioration due to the noise generated from the noise source 103 is reduced.

It should be noted that, in the example of FIG. 4, there is no device between the radio noise canceler 104A and the wireless receivers 101 and 102. However, even when there is another device between the radio noise canceler 104A and the wireless receivers 101 and 102, the noise canceling effect in the wireless receivers 101 and 102 remains unaffected.

Figure 5:
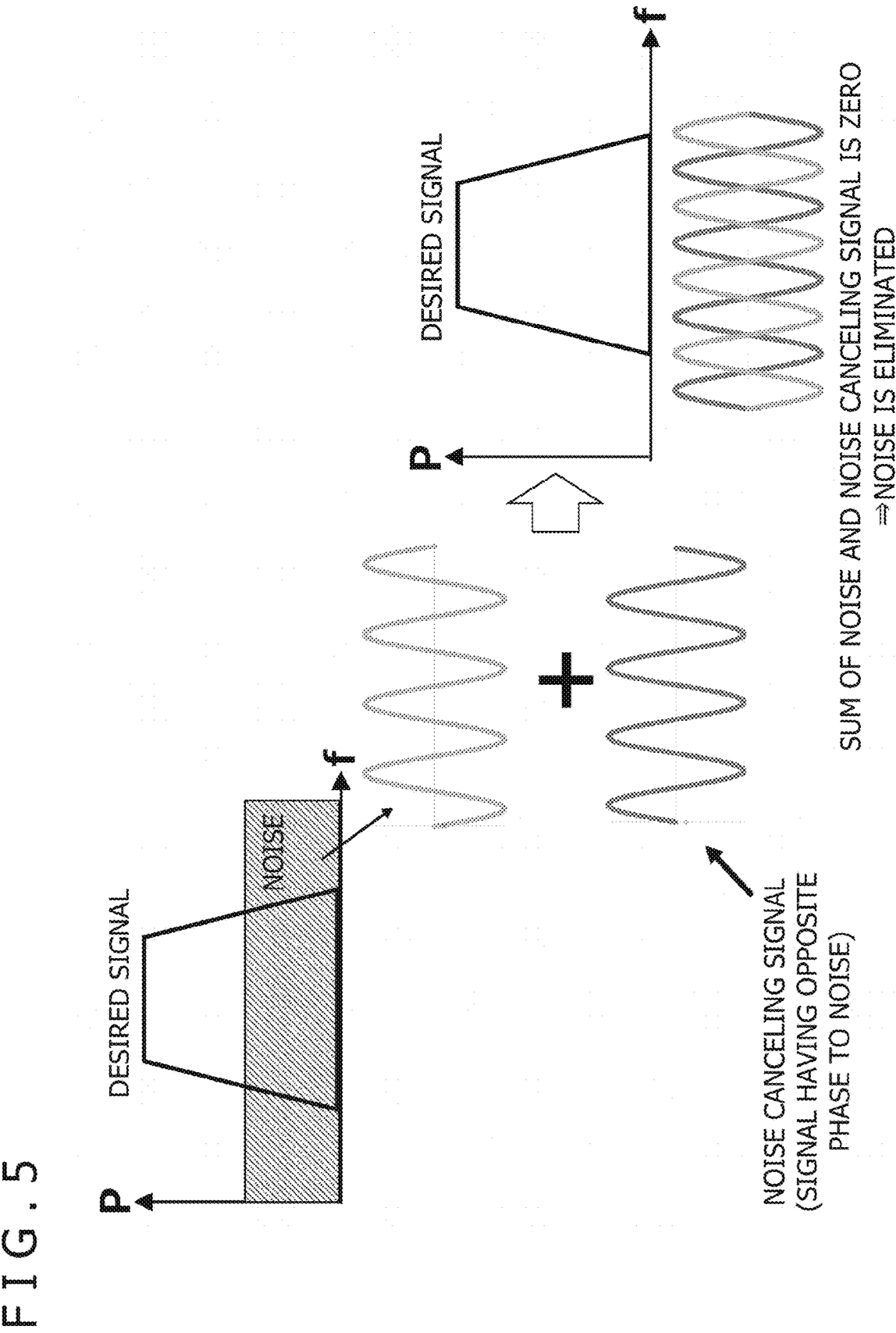
FIG. 5 is a schematic diagram illustrating how the noise in the wireless receiver is canceled by the noise canceling signal to eventually obtain only a desired noise-free signal as a received signal.

FIG. 5 schematically illustrates how the noise in the wireless receiver 101 or 102 is canceled by the noise canceling signal to eventually obtain only a desired noise-free signal as the received signal. In this case, even in a state where the noise is received together with the desired signal, the noise canceling signal is simultaneously received, so that the noise is canceled by the noise canceling signal. Eventually, only the desired signal remains.

As described above, the camera 100A depicted in FIG. 1 includes the radio noise canceler 104A. The radio noise canceler 104A acquires the noise generated from the noise source 103, adjusts the phase and the gain of the acquired noise to obtain the noise canceling signal, and transmits the obtained noise canceling signal from the antenna 141.

Consequently, the noise generated from the noise source 103 to affect the sensitivity of the wireless receivers 101 and 102 can properly be canceled to reduce the deterioration of receiver sensitivity in the wireless receivers 101 and 102 due to the radio noise. Further, the noise reducing the sensitivity in the wireless receivers 101 and 102 can be canceled without adding a circuit to the wireless receivers 101 and 102. Furthermore, even when there is a plurality of wireless receivers (the two wireless receivers 101 and 102 in the example of FIG. 1), noise cancelation can be achieved by only one radio noise canceler 104A.

Moreover, in the camera 100A depicted in FIG. 1, the radio noise canceler 104A acquires the noise generated from the noise source 103 by allowing the antenna 141 to receive the generated noise. This makes it possible to effectively use the antenna 141, and requires no electrical wiring to acquire the noise from the noise source 103. Therefore, the radio noise canceler 104A can easily be disposed in the camera 100A.

Additionally, in the camera 100A depicted in FIG. 1, the radio noise canceler 104A includes the circulator 142 that acts as a directional coupler section. More specifically, the circulator 142 not only transmits the noise, which is generated from the noise source 103 and received by the antenna 141, to the phase adjustment section 143 included in the noise adjustment section, but also transmits the noise canceling signal, which is obtained by the gain adjustment section 144 included in the noise adjustment section, to the antenna 141. Therefore, directional coupling to the antenna 141 is properly achieved, so that the antenna 141 can be effectively used to receive the noise and transmit the noise canceling signal.

Further, in the camera 100A depicted in FIG. 1, the location of the radio noise canceler 104A within the camera 100A is determined in such a manner that the distance d between the antenna 141 and the noise source 103 is equal to or less than 1/10 the wavelength of the radio signal to be received by the wireless receivers 101 and 102. Consequently, in a case where the noise generated from the noise source 103 to affect the sensitivity of the wireless receivers 101 and 102 is to be canceled by the noise canceling signal, which is transmitted from the antenna 141 in an opposite phase to the noise, the phase shift between the noise and the noise canceling signal can be reduced to improve cancelation accuracy.

2. Second Embodiment

The camera 100A depicted in FIG. 1 is such an example in which the radio noise canceler 104A uses the antenna 141 to receive the noise generated from the noise source 103. However, it is also conceivable that the noise generated from the noise source 103 may be acquired through electrical wiring.

FIG. 6 illustrates an example configuration of a camera 100B according to a second embodiment. Portions depicted in FIG. 6 in correspondence with those depicted in FIG. 1 are designated by the same reference signs as used in FIG. 1, and will not be redundantly described in detail appropriately. The camera 100B includes the wireless receivers 101 and 102, the noise source 103, and a radio noise canceler 104B that functions as the noise canceling apparatus.

The radio noise canceler 104B includes not only the antenna 141, the phase adjustment section 143, and the gain adjustment section 144, but also electrical wiring 105 for acquiring the noise generated from the noise source 103. The electrical wiring 105 includes a capacitor for blocking direct current.

In the camera 100B depicted in FIG. 6, the noise generated from the noise source 103 is received by the wireless receivers 101 and 102. Further, the noise generated from the noise source 103 is acquired by the radio noise canceler 104B through the electrical wiring 105.

In the radio noise canceler 104B, the phase and the gain of the acquired noise are adjusted by the phase adjustment section 143 and the gain adjustment section 144 to generate the noise canceling signal having an opposite phase to the acquired noise. The generated noise canceling signal is transmitted from the antenna 141. The noise canceling signal transmitted from the antenna 141 is also received by the wireless receivers 101 and 102.

In each of the wireless receivers 101 and 102, the received noise is canceled by the received noise canceling signal (see FIGS. 4 and 5). This enables each of the wireless receivers 101 and 102 to receive only a desired signal, and thus reduces sensitivity deterioration due to the noise generated from the noise source 103.

As described above, the camera 100B depicted in FIG. 6 includes the radio noise canceler 104B which acquires the noise generated from the noise source 103, adjusts the phase and the gain of the acquired noise to obtain the noise canceling signal, and transmits the obtained noise canceling signal from the antenna 141. Consequently, as is the case with the camera 100A depicted in FIG. 1, the noise generated from the noise source 103 to affect the sensitivity of the wireless receivers 101 and 102 can properly be canceled to provide various advantages such as reducing the deterioration of receiver sensitivity in the wireless receivers 101 and 102 due to the radio noise.

Further, in the camera 100B depicted in FIG. 6, the radio noise canceler 104B acquires the noise generated from the noise source 103 through the electrical wiring 105. This eliminates the necessity of adding a circulator or other directional coupler to the radio noise canceler 104B as in a case where the antenna 141 is used also for noise reception, and makes it possible to precisely acquire the noise generated from the noise source 103 to which attention is paid.

3. Third Embodiment

The camera 100A depicted in FIG. 1 is such a case in which a noise source to which attention is paid is only one. However, it is also conceivable that a noise source to which attention is paid may be present in plural.

FIG. 7 illustrates an example configuration of a camera 100C according to a third embodiment. Portions depicted in FIG. 7 in correspondence with those depicted in FIG. 1 are designated by the same reference signs as used in FIG. 1, and will not be redundantly described in detail appropriately. The camera 100C includes the wireless receivers 101 and 102, noise sources 103a and 103b, and the radio noise canceler 104A that functions as the noise canceling apparatus.

The antenna 141 of the radio noise canceler 104A not only receives noise generated from each of the noise sources 103a and 103b, but also transmits the noise canceling signal, which is outputted from the gain adjustment section 144. The radio noise canceler 104C is disposed in the camera 100C in such a manner that the distances da and db between the antenna 141 and the noise sources 103a and 103b, respectively, are equal to or less than 1/10 the wavelength of the radio signal to be received by the wireless receivers 101 and 102.

Since the radio noise canceler 104A is disposed as described above, in a case where the noise generated from each of the noise sources 103a and 103b to affect the sensitivity of the wireless receivers 101 and 102 is to be canceled by the noise canceling signal, which is transmitted from the antenna 141 in an opposite phase to the noise, the phase shift between the noise and the noise canceling signal can be reduced to improve cancelation accuracy as described later.

FIG. 8 illustrates an example location of the radio noise canceler 104A that is mounted on a substrate in a case where the main LSI 120 and the sub LSI 123 act as the two noise sources generating noise affecting the sensitivity of the wireless receiver (Wi-Fi/Bluetooth receiver) 101 and wireless receiver (GPS receiver) 102, which are mounted in the camera 100C. Portions depicted in FIG. 8 in correspondence with those depicted in FIG. 3 are designated by the same reference signs as used in FIG. 3.

In the above case, the radio noise canceler 104A is disposed near the main LSI 120 and the sub LSI 123 in such a manner that the distances da and db between its antenna 141 (see FIGS. 1 and 2) and the main LSI 120 and the sub LSI 123, respectively, are equal to less than 1/10 the wavelength of the radio signal to be received by the wireless receiver (Wi-Fi/Bluetooth receiver) 101 and the wireless receiver (GPS receiver) 102.

Consequently, in a case where the noise generated from the noise sources 103 to affect the sensitivity of the wireless receiver (Wi-Fi/Bluetooth receiver) 101 and wireless receiver (GPS receiver) 102 is to be canceled by the noise canceling signal, which is transmitted from the antenna 141 in an opposite phase to the noise, the phase shift between the noise and the noise canceling signal can be reduced to improve cancelation accuracy.

In the camera 100C depicted in FIG. 7, the noise generated from each of the noise sources 103a and 103b is received by the wireless receivers 101 and 102. Further, the noise generated from each of the noise sources 103a and 103b is also received by the antenna 141 of the radio noise canceler 104A.

The radio noise canceler 104A is configured such that the phase and the gain of the received noise are adjusted by the phase adjustment section 143 and the gain adjustment section 144 to generate the noise canceling signal having an opposite phase to the received noise. The generated noise canceling signal is transmitted from the antenna 141. The noise canceling signal transmitted from the antenna 141 is also received by the wireless receivers 101 and 102.

In each of the wireless receivers 101 and 102, the received noise is canceled by the received noise canceling signal (see FIGS. 4 and 5). This enables each of the wireless receivers 101 and 102 to receive only a desired signal, and thus reduces sensitivity deterioration due to the noise generated from each of the noise sources 103a and 103b.

As described above, the camera 100C depicted in FIG. 7 includes the radio noise canceler 104A, which acquires the noise generated from each of the noise sources 103a and 103b, adjusts the phase and the gain of the acquired noise to obtain the noise canceling signal, and transmits the obtained noise canceling signal from the antenna 141. Consequently, as is the case with the camera 100A depicted in FIG. 1, the noise generated from each of the noise sources 103a and 103b to affect the sensitivity of the wireless receivers 101 and 102 can properly be canceled to provide various advantages such as reducing sensitivity deterioration in the wireless receivers 101 and 102 due to the radio noise.

It should be noted that the camera 100C depicted in FIG. 7 includes the two noise sources 103a and 103b. However, the camera 1000 can be configured in a similar manner even in a case where the camera 1000 includes three or more noise sources. Further, in some cases where two or more noise sources are present, it may be difficult to dispose the radio noise canceler 104A in such a manner that each of the distances between the noise sources and the antenna 141 of the radio noise canceler 104A is equal to or less than ¹⁄₁₀ the wavelength of the radio signal to be received by the wireless receiver 101 and the wireless receiver 102.

In the above-described cases, it is conceivable that the radio noise canceler 104A is disposed near the main noise source significantly affecting the sensitivity of the wireless receivers 101 and 102 in such a manner that the distance between the main noise source and the antenna 141 of the radio noise canceler 104 is equal to or less than ¹⁄₁₀ the wavelength of the radio signal to be received by the wireless receiver 101 and the wireless receiver 102.

4. Fourth Embodiment

The camera 100A depicted in FIG. 1 is configured such that the phase adjustment section 143 and the gain adjustment section 144 in the radio noise canceler 104A use predetermined parameters (experimental values determined before a design process) for adjustment purposes. However, it is also conceivable that automation may be performed in such a manner as to enable the phase adjustment section and the gain adjustment section of the radio noise canceler to properly adjust the phase and the gain in reference to sensitivity information regarding the wireless receivers 101 and 102. Such automation makes it possible to adjust the phase and the gain in such a manner that the sensitivity in the wireless receivers 101 and 102 is constantly optimized. Here, the sensitivity information is, for example, what is generally called S/R information, that is, the information indicating the ratio between a noise wave received by the wireless receivers 101 and 102 and a desired wave.

FIG. 9 illustrates an example configuration of a camera 100D according to a fourth embodiment. Portions depicted in FIG. 9 in correspondence with those depicted in FIG. 1 are designated by the same reference signs as used in FIG. 1, and will not be redundantly described in detail appropriately. The camera 100D includes the wireless receivers 101 and 102, the noise source 103, and a radio noise canceler 104D that functions as the noise canceling apparatus.

The radio noise canceler 104D includes a phase adjustment section 143D and a gain adjustment section 144D. The phase adjustment section 143D and the gain adjustment section 144D respectively correspond to the phase adjustment section 143 and the gain adjustment section 144, which are included in the radio noise canceler 104A in the camera 100A depicted in FIG. 1, and are configured to obtain the noise canceling signal by adjusting the phase and the gain of the noise acquired by the antenna 141.

In the above case, the phase and the gain adjustments in the phase adjustment section 143D and the gain adjustment section 144D are made in reference to the sensitivity information regarding the wireless receivers 101 and 102. More specifically, the phase adjustment section 143D and the gain adjustment section 144D make the phase and the gain adjustments by using the parameters that are calculated so as to optimize the sensitivity in the wireless receivers 101 and 102 in reference to the sensitivity information regarding the wireless receivers 101 and 102.

For example, in order to calculate the parameters to be used by the phase adjustment section 143D and the gain adjustment section 144D, it is conceivable that the radio noise canceler 104D may include a calculation section 145 and a calculation section 146 as depicted in FIG. 10. The calculation section 145 calculates the parameters for the phase adjustment section 143D in reference to the sensitivity information regarding the wireless receivers 101 and 102.

The calculation section 146 calculates the parameters for the gain adjustment section 144D in reference to the sensitivity information regarding the wireless receivers 101 and 102.

Figure 11:
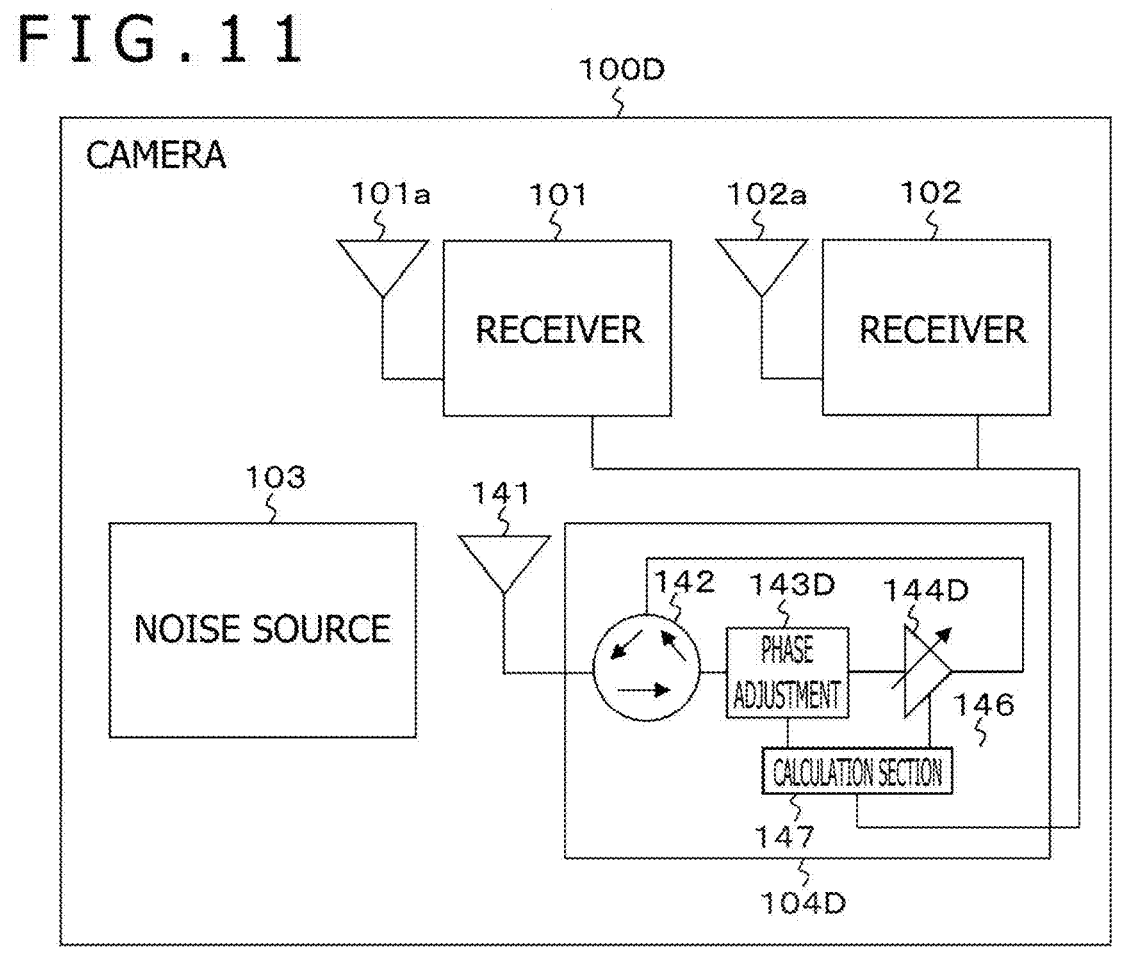

Further, for example, in order to calculate the parameters to be used by the phase adjustment section 143D and the gain adjustment section 144D, it is conceivable that the radio noise canceler 104D may include a calculation section 147 as depicted in FIG. 11. The calculation section 147 calculates both of the parameters for the phase adjustment section 143D and the gain adjustment section 144D in reference to the sensitivity information regarding the wireless receivers 101 and 102.

Figure 12:
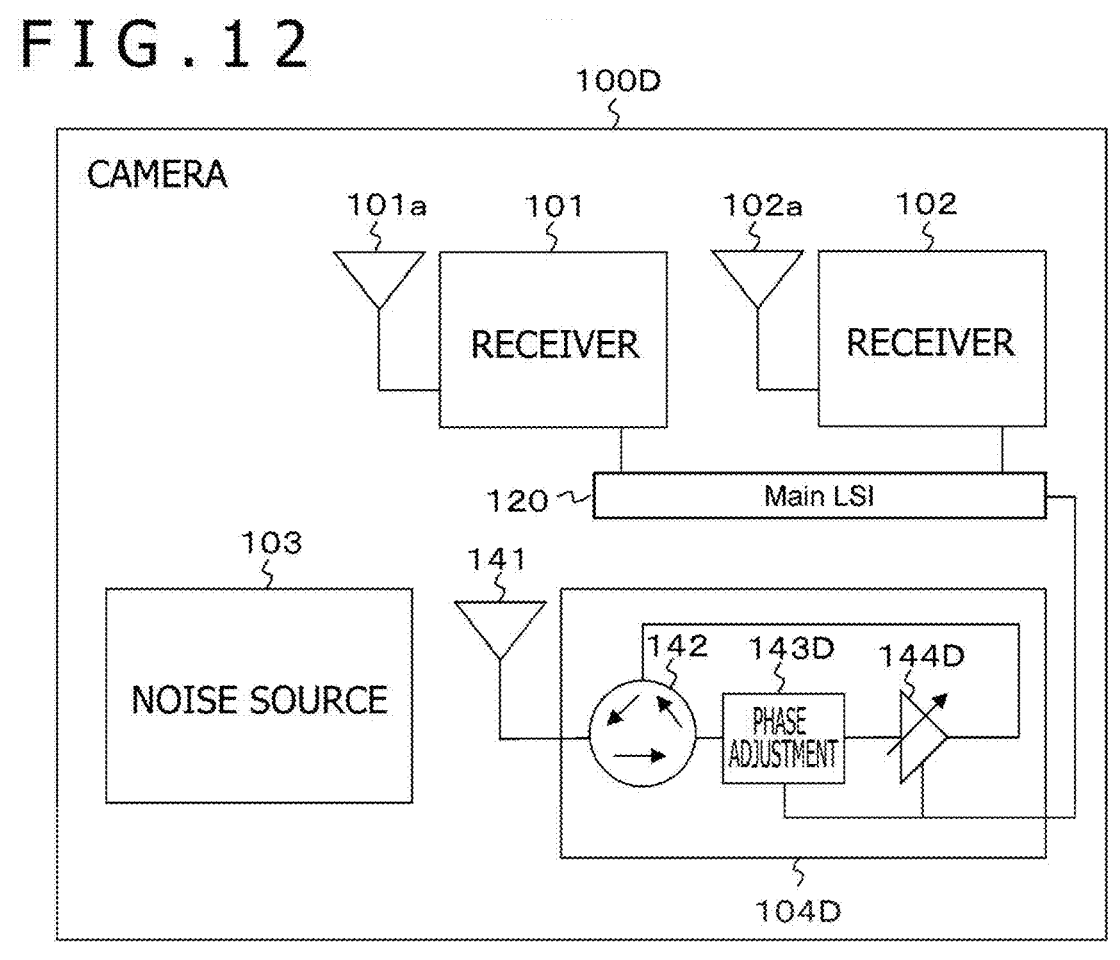

Furthermore, for example, it is conceivable that the main LSI 120 may calculate the parameters to be used in the phase adjustment section 143D and the gain adjustment section 144D, as depicted in FIG. 12.

It should be noted that the sections configured to calculate the parameters for adjustments to be made in the phase adjustment section 143D and the gain adjustment section 144D are not limited to those described in the above examples. The parameters may be calculated by some other sections.

In the camera 100D depicted in FIG. 9, the noise generated from the noise source 103 is received by the wireless receivers 101 and 102. Further, the noise generated from the noise source 103 is also received by the antenna 141 of the radio noise canceler 104D.

In the radio noise canceler 104D, the phase and the gain of the received noise are adjusted by the phase adjustment section 143D and the gain adjustment section 144D to generate the noise canceling signal having an opposite phase to the received noise. Here, the phase adjustment section 143D and the gain adjustment section 144D make the phase and the gain adjustments by using the parameters that are calculated so as to optimize the sensitivity in the wireless receivers 101 and 102 in reference to the sensitivity information regarding the wireless receivers 101 and 102.

As described above, the noise canceling signal generated by the radio noise canceler 104D is transmitted from the antenna 141. The noise canceling signal transmitted from the antenna 141 is also received by the wireless receivers 101 and 102.

In each of the wireless receivers 101 and 102, the received noise is canceled by the received noise canceling signal (see FIGS. 4 and 5). This enables each of the wireless receivers 101 and 102 to receive only a desired signal, and thus reduces sensitivity deterioration due to the noise generated from the noise source 103.

As described above, the camera 100D depicted in FIG. 9 includes the radio noise canceler 104D, which acquires the noise generated from the noise source 103, adjusts the phase and the gain of the acquired noise to obtain the noise canceling signal and transmits the obtained noise canceling signal from the antenna 141. Consequently, as is the case with the camera 100A depicted in FIG. 1, the noise generated from the noise source 103 to affect the sensitivity of the wireless receivers 101 and 102 can properly be canceled to provide various advantages such as reducing sensitivity deterioration in the wireless receivers 101 and 102 due to the radio noise.

Further, the radio noise canceler 104D in the camera 100D depicted in FIG. 9 adjusts the phase and the gain of the noise received by the antenna 141 in reference to the sensitivity information regarding the wireless receivers 101 and 102. More specifically, the phase adjustment section 143D and the gain adjustment section 144D in the radio noise canceler 104D adjust the phase and the gain by using the parameters that are calculated so as to optimize the sensitivity in the wireless receivers 101 and 102 in reference to the sensitivity information regarding the wireless receivers 101 and 102. Consequently, the phase and the gain adjustments can automatically be made so as to constantly optimize the sensitivity in the wireless receivers 101 and 102.

5. Modifications

It should be noted that, in the foregoing embodiments of the present technology, a camera is used as the electronic equipment having the radio noise canceler. However, the present technology can be similarly applied to other pieces of electronic equipment (e.g., smartphones, smartwatches, portable audio players, personal computers, television receivers, smart speakers, and robots) having wireless receivers whose sensitivity is affected by a noise source or noise generated from the noise source.

Further, the foregoing embodiments have been described on the assumption that the radio noise canceler and the wireless receivers are disposed in the same electronic equipment. However, it is conceivable that the radio noise canceler and the wireless receivers may be disposed in separate pieces of electronic equipment. In such a case, the radio noise canceler is disposed near a noise source in the electronic equipment having the noise source. Further, it is also conceivable that the radio noise canceler may be disposed independently of the electronic equipment having a noise source.

Furthermore, the foregoing embodiments have been described on the assumption that a Wi-Fi receiver, a Bluetooth receiver, and a GPS receiver are used as the wireless receivers. However, other wireless receivers, such as 4G or 5G mobile communication system receivers, may alternatively be used as the wireless receivers.

Moreover, while preferred embodiments of the present disclosure have been described in detail with reference to the accompanying drawings, the technical scope of the present disclosure is not limited to that of the above-described preferred embodiments. It is obvious that persons having ordinary skill in the art related to the present disclosure will be able to devise various alterations and modifications without departing from the scope of the technical idea described in the appended claims. Additionally, it is to be understood that such alterations and modifications are obviously within the technical scope of the present disclosure.

Further, the advantages described in this document are merely explanatory or illustrative and not restrictive. Specifically, the technology according to the present disclosure can provide other advantages obvious to persons skilled in the art from the description in this document together with or in place of the above-described advantages.

In addition, the present technology can also adopt the following configurations.

(1)

A noise canceling apparatus including:

a noise acquisition section that acquires noise generated from a noise source;

a noise adjustment section that obtains a noise canceling signal by adjusting a phase and a gain of the noise acquired by the noise acquisition section; and an antenna section that transmits the noise canceling signal obtained by the noise adjustment section.

(2)

The noise canceling apparatus according to (1) above, in which the noise acquisition section acquires the noise generated from the noise source by allowing the antenna section to receive the generated noise.

(3)

The noise canceling apparatus according to (2) above, further including:

a directional coupler section that sends, to the noise adjustment section, the noise generated from the noise source and received by the antenna section, and sends, to the antenna section, the noise canceling signal obtained by the noise adjustment section.

(4)

The noise canceling apparatus according to (3) above, in which the directional coupler section includes a circulator.

(5)

The noise canceling apparatus according to (1) above, in which the noise acquisition section acquires, through electrical wiring, the noise generated from the noise source.

(6)

The noise canceling apparatus according to any one of (1) to (5) above, in which the antenna section is disposed to be spaced from the noise source by a distance of equal to or less than $\frac{1}{10}$ a wavelength of a radio signal to be received by a predetermined wireless receiver section.

(7)

The noise canceling apparatus according to any one of (1) to (6) above, in which, in reference to sensitivity information regarding a predetermined wireless receiver section, the noise adjustment section adjusts the phase and the gain of the noise acquired by the noise acquisition section.

(8)

The noise canceling apparatus according to any one of (1) to (7) above, in which the noise source includes a noise source being present in electronic equipment having a predetermined wireless receiver.

(9)

The noise canceling apparatus according to (8) above, in which the electronic equipment includes a camera.

(10)

A noise canceling method including:

a procedure of acquiring noise generated from a noise source;

a procedure of obtaining a noise canceling signal by adjusting a phase and a gain of the acquired noise; and a procedure of transmitting the obtained noise canceling signal from an antenna section.

(11)

Electronic equipment including:

a predetermined wireless receiver section;

a noise source that generates noise affecting sensitivity of the predetermined wireless receiver section; and a noise canceling apparatus, in which the noise canceling apparatus includes a noise acquisition section that acquires noise generated from the noise source, a noise adjustment section that obtains a noise canceling signal by adjusting a phase and a gain of the noise acquired by the noise acquisition section, and an antenna section that transmits the noise canceling signal obtained by the noise adjustment section.

REFERENCE SIGNS LIST

100A to 100D: Camera

101: Wireless receiver (WiFi/Bluetooth receiver)

101*a*, 102*a*: Antenna
102: Wireless receiver (GPS receiver)
103, 103*a*, 103*b*: Noise source
104A, 104B, 104D: Noise canceler
105: Electrical wiring
120: Main LSI
121: Camera lens
122: Image sensor
123: Sub LSI
124: LCD panel
125: Electronic viewfinder
126: Reference clock
127: Power supply
128: External interface
129: External storage device
130: LSI
141: Antenna
142: Circulator
143, 143D: Phase adjustment section
144, 144D: Gain adjustment section
145, 146, 147: Calculation section

The invention claimed is:

1. A noise canceling apparatus comprising:
a noise acquisition section that acquires noise generated from a noise source;
a noise adjustment section that obtains a noise canceling signal by adjusting a phase and a gain of the noise acquired by the noise acquisition section;
an antenna section that transmits the noise canceling signal obtained by the noise adjustment section,
wherein the noise acquisition section acquires the noise generated from the noise source by allowing the antenna section to receive the generated noise; and
a directional coupler section that sends, to the noise adjustment section, the noise generated from the noise source and received by the antenna section, and sends, to the antenna section, the noise canceling signal obtained by the noise adjustment section.

2. The noise canceling apparatus according to claim 1, wherein the directional coupler section includes a circulator.

3. The noise canceling apparatus according to claim 1, wherein the noise acquisition section acquires, through electrical wiring, the noise generated from the noise source.

4. The noise canceling apparatus according to claim 1, wherein the antenna section is disposed to be spaced from the noise source by a distance of equal to or less than $\frac{1}{10}$ a wavelength of a radio signal to be received by a predetermined wireless receiver section.

5. The noise canceling apparatus according to claim 1, wherein, in reference to sensitivity information regarding a predetermined wireless receiver section, the noise adjustment section adjusts the phase and the gain of the noise acquired by the noise acquisition section.

6. The noise canceling apparatus according to claim 1, wherein the noise source includes a noise source being present in electronic equipment having a predetermined wireless receiver.

7. The noise canceling apparatus according to claim 6, wherein the electronic equipment includes a camera.

8. Electronic equipment comprising:
a predetermined wireless receiver section;
a noise source that generates noise affecting sensitivity of the predetermined wireless receiver section; and
a noise canceling apparatus,
wherein the noise canceling apparatus includes
a noise acquisition section that acquires noise generated from the noise source, a noise adjustment section that obtains a noise canceling signal by adjusting a phase and a gain of the noise acquired by the noise acquisition section,
an antenna section that transmits the noise canceling signal obtained by the noise adjustment section,
wherein the noise acquisition section acquires the noise generated from the noise source by allowing the antenna section to receive the generated noise, and
a directional coupler section that sends, to the noise adjustment section, the noise generated from the noise source and received by the antenna section, and sends, to the antenna section, the noise canceling signal obtained by the noise adjustment section.

9. The electronic equipment according to claim 8, wherein the directional coupler section includes a circulator.

10. The electronic equipment according to claim 8, wherein the noise acquisition section acquires, through electrical wiring, the noise generated from the noise source.

11. The electronic equipment according to claim 8, wherein the antenna section is disposed to be spaced from the noise source by a distance of equal to or less than $\frac{1}{10}$ a wavelength of a radio signal to be received by a predetermined wireless receiver section.

12. The electronic equipment according to claim 8, wherein, in reference to sensitivity information regarding a predetermined wireless receiver section, the noise adjustment section adjusts the phase and the gain of the noise acquired by the noise acquisition section.

13. A noise canceling apparatus comprising:
a noise acquisition circuit that acquires noise generated from a noise source;
a noise adjustment circuit that obtains a noise canceling signal by adjusting a phase and a gain of the noise acquired by the noise acquisition circuit;
an antenna circuit that transmits the noise canceling signal obtained by the noise adjustment circuit,
wherein the noise acquisition circuit acquires the noise generated from the noise source by allowing the antenna circuit to receive the generated noise; and
a directional coupler circuit that sends, to the noise adjustment circuit, the noise generated from the noise source and received by the antenna circuit, and sends, to the antenna circuit, the noise canceling signal obtained by the noise adjustment circuit.

14. The noise canceling apparatus according to claim 13, wherein the directional coupler circuit includes a circulator.

15. The noise canceling apparatus according to claim 13, wherein the noise acquisition circuit acquires, through electrical wiring, the noise generated from the noise source.

16. The noise canceling apparatus according to claim 13, wherein the antenna circuit is disposed to be spaced from the noise source by a distance of equal to or less than $\frac{1}{10}$ a wavelength of a radio signal to be received by a predetermined wireless receiver circuit.

17. The noise canceling apparatus according to claim 13, wherein, in reference to sensitivity information regarding a predetermined wireless receiver circuit, the noise adjustment circuit adjusts the phase and the gain of the noise acquired by the noise acquisition circuit.

18. The noise canceling apparatus according to claim 13, wherein the noise source includes a noise source being present in electronic equipment having a predetermined wireless receiver.

19. The noise canceling apparatus according to claim 18, wherein the electronic equipment includes a camera.

* * * * *